(12) United States Patent
Clevelario et al.

(10) Patent No.: US 9,909,368 B2
(45) Date of Patent: Mar. 6, 2018

(54) FLEXIBLE PIPE AND A METHOD FOR PROVIDING BUOYANCY TO A JUMPER OR RISER ASSEMBLY

(71) Applicant: GE Oil & Gas UK Limited, Nailsea, Bristol (GB)

(72) Inventors: Judimar de Assis Clevelario, Rio de Janeiro (BR); Fabio de Souza Pires, Rio de Janeiro (BR); Claudio Cezario de Barros, Rio de Janeiro (BR); Rafael Goes, Rio de Janeiro (BR)

(73) Assignee: GE Oil & Gas UK Limited, Nailsea, Bristol (GB)

( * ) Notice: Subject to any disclaimer, the term of this patent is extended or adjusted under 35 U.S.C. 154(b) by 0 days.

(21) Appl. No.: 15/267,023

(22) Filed: Sep. 15, 2016

(65) Prior Publication Data
US 2017/0067296 A1 Mar. 9, 2017

Related U.S. Application Data

(63) Continuation of application No. 14/506,401, filed on Oct. 3, 2014, now abandoned, which is a continuation
(Continued)

(51) Int. Cl.
*E21B 17/01* (2006.01)
*F16L 11/08* (2006.01)
(Continued)

(52) U.S. Cl.
CPC .......... *E21B 17/012* (2013.01); *E21B 17/015* (2013.01); *E21B 17/017* (2013.01);
(Continued)

(58) Field of Classification Search
USPC ......... 405/169, 171, 173, 158, 154.1, 168.1, 405/168.2, 184.1; 138/118, 177, 178;
(Continued)

(56) References Cited

U.S. PATENT DOCUMENTS

| 3,651,525 A | 3/1972 | Rutten et al. |
| 4,065,822 A | 1/1978 | Wilbourn |

(Continued)

FOREIGN PATENT DOCUMENTS

| FR | 2386757 A1 | 4/1977 |
| GB | 2322406 A | 8/1998 |

(Continued)

OTHER PUBLICATIONS

Notice of Opposition filed against European Application No. EP2337 923, European Patent Office, dated Dec. 5, 2012, 19 pages.
(Continued)

*Primary Examiner* — Sean D Andrish
(74) *Attorney, Agent, or Firm* — Klarquist Sparkman, LLP (57) ABSTRACT

A riser or jumper assembly for transporting production, exportation or injection fluids is disclosed as is a method for providing buoyancy to such an assembly. The riser or jumper assembly includes a first segment of flexible pipe comprising a portion of flexible pipe body and a first and second end fitting, a further segment of flexible pipe comprising a portion of flexible pipe body and a first and second end fitting and an intermediate segment of flexible pipe comprising a portion of flexible pipe body and a first and second end fitting and at least one buoyancy element.

13 Claims, 5 Drawing Sheets

Related U.S. Application Data of application No. 13/122,949, filed as application No. PCT/GB2009/051023 on Aug. 14, 2009, now abandoned.

(51) Int. Cl.
*F16L 11/133* (2006.01)
*E21B 19/00* (2006.01)
*E21B 47/00* (2012.01)

(52) U.S. Cl.
CPC ........ *E21B 19/002* (2013.01); *E21B 47/0001* (2013.01); *F16L 11/083* (2013.01); *F16L 11/133* (2013.01)

(58) Field of Classification Search
USPC .................................. 166/242.2; 464/18–21
See application file for complete search history.

(56) References Cited

U.S. PATENT DOCUMENTS

| | | |
|---|---|---|
| 5,437,518 A | 8/1995 | Maloberti et al. |
| 5,615,977 A | 4/1997 | Moses et al. |
| 5,823,131 A | 10/1998 | Boatman et al. |
| 5,947,642 A | 9/1999 | Teixeira et al. |
| 6,558,215 B1 | 5/2003 | Boatman |
| 2004/0035484 A1 | 2/2004 | Mayau et al. |
| 2007/0137547 A1 | 6/2007 | Lemonides |
| 2008/0089745 A1 | 4/2008 | Salome et al. |
| 2008/0193219 A1 | 8/2008 | Luppi et al. |

FOREIGN PATENT DOCUMENTS

| | | |
|---|---|---|
| WO | WO1999/067561 A1 | 12/1999 |
| WO | WO2001/044706 A1 | 6/2001 |
| WO | WO2006/059220 A2 | 6/2006 |
| WO | WO2007/043862 A1 | 4/2007 |
| WO | WO2007/125276 A1 | 11/2007 |
| WO | WO 2007/215276 * | 11/2007 |
| WO | WO2008/107559 A2 | 9/2008 |

OTHER PUBLICATIONS

"Recommended Practice for Flexible Pipe," *American Petroleum Institute*, API Recommended Practice 17B, Third Edition, Mar. 2002, 166 pages.

"Specification for Unbonded Flexible Pipe," *American Petroleum Institute*, API Specification 17 J, Effective Date: Dec. 2002, 42 pages.

Rampi et al., "Trelline™—A Cost-Effective Alternative for Oil Offlaoding Lines (OOLs)," Offshore Technology Conference, Houston, Texas, May 4, 2006, 11 pages.

Webb et al., "Mid-water Bonded Rubber Hoses for Bonga Oil Offloading Riser (BOOR)," Deep Offshore Technology International Conference & Technology, Stavanger, Norway, Oct. 11, 2007, 23 pages.

International Search Report and Written Opinion of the International Searching Authority, dated Dec. 2, 2009, for corresponding International Application No. PCT/GB2009/051023, 11 pages.

International Preliminary Report on Patentability of the International Searching Authority, dated Apr. 21, 2011, for corresponding International Application No. PCT/GB2009/051023, 6 pages.

Office Action from the United States Patent & Trademark Office in co-pending U.S. Appl. No. 13/122,949, dated Sep. 10, 2013.

Office Action from the United States Patent & Trademark Office in U.S. Appl. No. 13/122,949, dated Apr. 3, 2014.

Office Action from the United States Patent & Trademark Office in co-pending U.S. Appl. No. 14/506,401, dated Jun. 23, 2015.

Office Action from the United States Patent & Trademark Office in co-pending U.S. Appl. No. 14/506,401, dated Oct. 29, 2016.

Office Action from the United States Patent & Trademark Office in co-pending U.S. Appl. No. 14/506,401, dated Mar. 16, 2016.

Lane et al., "Bend Stiffeners for Flexible Risers," OTC 7730, 27$^{th}$ Annual Offshore Technology Conference, Houston, Texas, May 1-4, 1995, 9 pages.

Decoret et al., "Innovative Optimization of a Large-ID Sour-Service Flexible Riser for the Baobab Project in 1000m Water Depth, West of Africa," OTC 18667, 2007 Offshore Technology Conference, Houston, Texas, Apr. 30-May 3, 2007, 8 pages.

Remery et al., "The Free Standing Flexible Riser: A Novel Riser System for an Optimised Installation Process," OTC 19437, 2008 Offshore Technology Conference, Houston, Texas, May 5-8, 2008, 11 pages.

Statement of Grounds of Appeal (including English translation) submitted by Technip France, filed with the European Patent Office in Appeal No. T1254/17-3.2.03 for European Patent No. EP2337923, dated Jul. 20, 2017, 29 pages.

Statement of Grounds of Appeal submitted by GE Oil & Gas UK Limited, filed with the European Patent Office in Appeal No. T1254/17-3.2.03 for European Patent No. EP2337923, dated Jul. 31, 2017, 14 pages.

* cited by examiner

FLEXIBLE PIPE AND A METHOD FOR PROVIDING BUOYANCY TO A JUMPER OR RISER ASSEMBLY

CROSS REFERENCE TO RELATED APPLICATIONS

This is a Continuation of U.S. patent application Ser. No. 14/506,401, filed Oct. 3, 2014, which is a Continuation of U.S. patent application Ser. No. 13/122,949, filed Apr. 6, 2011, which is the U.S. National Stage of International Application No. PCT/GB2009/051023, filed Aug. 14, 2009, which in turn claims the benefit of Great Britain Application No. GB0818500.1, filed Oct. 9, 2008.

FIELD

The present invention relates to flexible pipes which may be used to convey fluids such as production fluids, exportation fluids or injection fluids from a source to a further location. In particular, but not exclusively, the present invention relates to a riser or jumper assembly incorporating an intermediate segment of flexible pipe which is used to carry one or more buoyancy elements.

BACKGROUND

Traditionally flexible pipe is utilised to transport production fluids, exportation fluids or injection fluids such as oil and/or gas and/or water from one location to another. Flexible pipe is particularly useful in connecting a sub-sea location to a further sub-sea location or a sea level location. Flexible pipe is generally formed as a length of flexible pipe body and one or more end fittings at the ends of the pipe body. The pipe body is typically formed as a composite structure of tubular layers of material that form a fluid and pressure containing conduit. The pipe structure is flexible and allows relatively large deflections without causing bending stresses that impair the pipe's functionality over a desired lifetime. The pipe body is generally, but not necessarily, built up as a composite structure including metallic and polymer layers. Flexible pipe may be utilised as a flow line over land and/or at a sub-sea location. Flexible pipe may also be used as a jumper or riser.

A riser is an assembly of one or more segments of flexible pipe connecting a sub-sea source location to a surface station or vessel. A jumper is an assembly of flexible pipe connecting a sub-sea location to a further sub-sea location. In both instances buoyancy elements have conventionally been used at desired locations so that in use the riser or jumper assembly adopts a predetermined shape. Conventional buoyancy elements are formed as separate modules manufactured from highly buoyant material or as hollow shells which can be filled with such buoyant material. Such buoyancy modules are conventionally clamped or otherwise secured to desired positions of the flexible pipe.

From time to time it is known that due to a clamping failure buoyancy modules will move from a desired location on the flexible pipe to a non-desired location. In some instances this can lead to failure of the flexible pipe as over-bending can occur.

A still further problem associated with such buoyancy modules is that should the material or integrity of the buoyancy module fail, leading to a lack of buoyancy, a large length of flexible pipe must be recovered and replaced to overcome the failure.

SUMMARY

It is an aim of the present invention to at least partly mitigate the above-mentioned problems.

It is an aim of certain embodiments of the present invention to provide a riser or jumper assembly or method for manufacturing a riser or jumper assembly in which a location of buoyancy modules is constrained even if a securing mechanism used to secure the buoyancy module to a flexible pipe body fails.

It is an aim of certain embodiments of the present invention to provide a riser or jumper assembly or method for manufacturing a riser or jumper assembly in which, should a buoyancy module fail, is relatively easy to replace the module or portion of flexible pipe carrying the module so as to minimise downtime.

According to a first aspect of the present invention there is provided a riser or jumper assembly for transporting production, exportation or injection fluids from a source location to a target location, comprising:
  a first segment of flexible pipe comprising a portion of flexible pipe body and a first and second end fitting;
  a further segment of flexible pipe comprising a portion of flexible pipe body and a first and second end fitting; and
  an intermediate segment of flexible pipe comprising a portion of flexible pipe body and a first and second end fitting and at least one buoyancy element.

According to a second aspect of the present invention there is provided a method for providing buoyancy to a jumper or riser assembly, comprising the steps of:
  providing lift to at least one portion of flexible pipe via at least one buoyancy element located between first and second end fittings of an intermediate segment of flexible pipe comprising said first and second end fittings and a portion of flexible pipe body.

Certain embodiments of the present invention provide a riser or jumper assembly which includes an intermediate segment of flexible pipe terminated with a first and second end fitting. One or more buoyancy elements are securable or are secured to the intermediate segment. Should one or more of the buoyancy elements fail the entire intermediate segment can be replaced in a relatively straightforward manner. Spare segments can be manufactured at the same time that the flexible pipe or flexible pipes making up the riser or jumper are manufactured to facilitate the ease of replacement.

Certain embodiments of the present invention provide a riser or jumper assembly in which an intermediate segment of flexible pipe is used having a first and second end fitting. Any movement of a buoyancy element secured to the intermediate segment, for example due to a failure of a clamping element, results only in motion of the buoyancy element within the end constraints provided by the first and second end fittings. In this way movement of buoyancy elements along the riser or jumper is at least limited or can be wholly eliminated.

BRIEF DESCRIPTION OF THE DRAWINGS

Embodiments of the present invention will now be described hereinafter, by way of example only, with reference to the accompanying drawings in which.

In the drawings like reference numerals refer to like parts.

DETAILED DESCRIPTION

Figure 1:
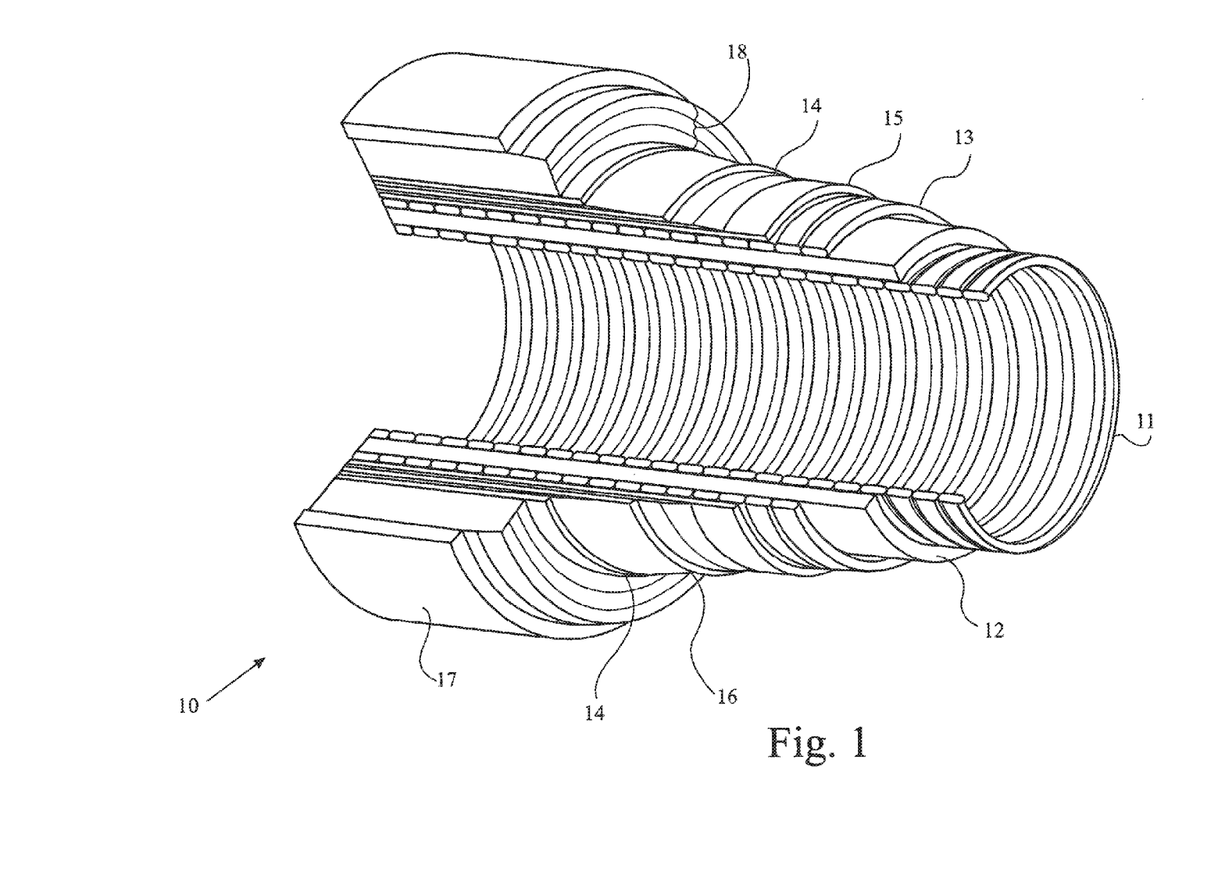
FIG. 1 illustrates flexible pipe body.

Throughout this specification reference will be made to a flexible pipe. It will be understood that a flexible pipe is an assembly of a portion of pipe body and one or more end fittings in each of which an end of the pipe body is terminated. FIG. 1 illustrates how a pipe body 10 is formed in accordance with an embodiment of the present invention from a composite of layered materials that form a pressure-containing conduit. Although a number of particular layers are illustrated in FIG. 1, it is to be understood that the present invention is broadly applicable to composite pipe body structures including two or more layers. It is to be further noted that the layer thicknesses are shown for illustrative purposes only.

As illustrated in FIG. 1, pipe body includes an innermost carcass layer 11. The carcass provides an interlocked metallic construction that can be used as the innermost layer to prevent, totally or partially, collapse of an internal pressure sheath 12 due to pipe decompression, external pressure, tensile armour pressure and mechanical crushing loads. It will be appreciated that embodiments of the present invention are applicable to 'smooth bore' as well as such 'rough bore' applications.

The internal pressure sheath 12 acts as a fluid retaining layer and typically comprises a polymer layer that ensures internal-fluid integrity. It is to be understood that this layer may itself comprise a number of sub-layers. It will be appreciated that when the optional carcass layer is utilised the internal pressure sheath is often referred to as a barrier layer. In operation without such a carcass (so-called smooth-bore operation) the internal pressure sheath may be referred to as a liner.

A pressure armour layer 13 is formed over the internal pressure sheath and is a structural layer with a lay angle close to 90° that increases the resistance of the flexible pipe to internal and external pressure and mechanical crushing loads. The layer also structurally supports the internal-pressure sheath and typically consists of an interlocked metallic construction.

The flexible pipe body may also include one or more layers of tape 14 and a first tensile armour layer 15 and second tensile armour layer 16. Each tensile armour layer is a structural layer with a lay angle typically between 20° and 55°. Each layer is used to sustain tensile loads and internal pressure. The tensile armour layers are counter-wound in pairs.

The flexible pipe body also includes an outer sheath 17 which comprises a polymer layer used to protect the pipe against penetration of seawater and other external environments, corrosion, abrasion and mechanical damage. One or more layers 18 of insulation may also be included.

Each flexible pipe comprises at least one portion, sometimes referred to as a segment or section of pipe body 10 together with an end fitting located at at least one end of the flexible pipe. Usually an end fitting is used at both ends of the segment of flexible pipe body. An end fitting provides a mechanical device which forms the transition between the flexible pipe body and a connector. The different pipe layers as shown, for example, in FIG. 1 are terminated in the end fitting in such a way as to transfer the load between the flexible pipe and the connector. Segments of flexible pipe may be joined together in an end-to-end arrangement to make long lengths of flexible pipe. The adjoined segments may include segments of identical flexible pipe body or segments in which the flexible pipe body has different layers and/or physical properties.

Figure 2:
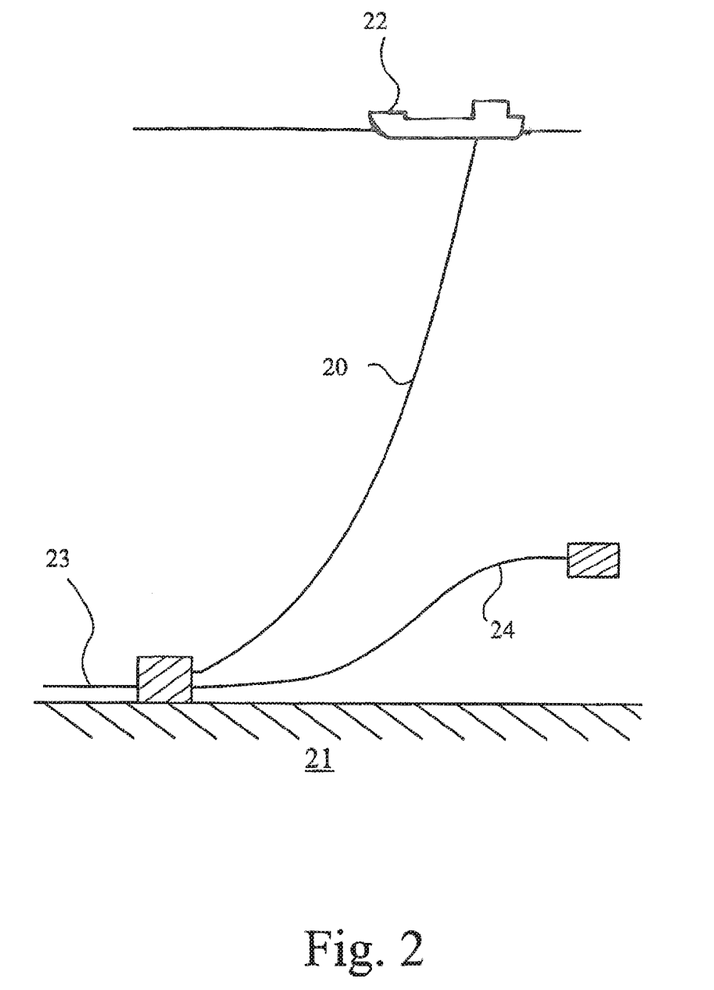
FIG. 2 illustrates a jumper and riser.

FIG. 2 illustrates a riser assembly suitable for transporting production, exportation or injection fluid such as oil and/or gas and/or water from a sub-sea location 21 to a floating facility. For example, in FIG. 2 the sub-sea location 21 is a connection to a sub-sea flow line 23. The flexible flow line comprises a flexible pipe, wholly or in part, resting on the sea floor or buried below the sea floor. The floating facility may for example be provided by a platform and/or buoy or, as illustrated in FIG. 2, a ship. The riser 20 is provided as a flexible riser, that is to say a flexible pipe connecting the ship to the sea floor installation. Alternatively the flexible pipe can be used as a jumper 24.

Figure 3:
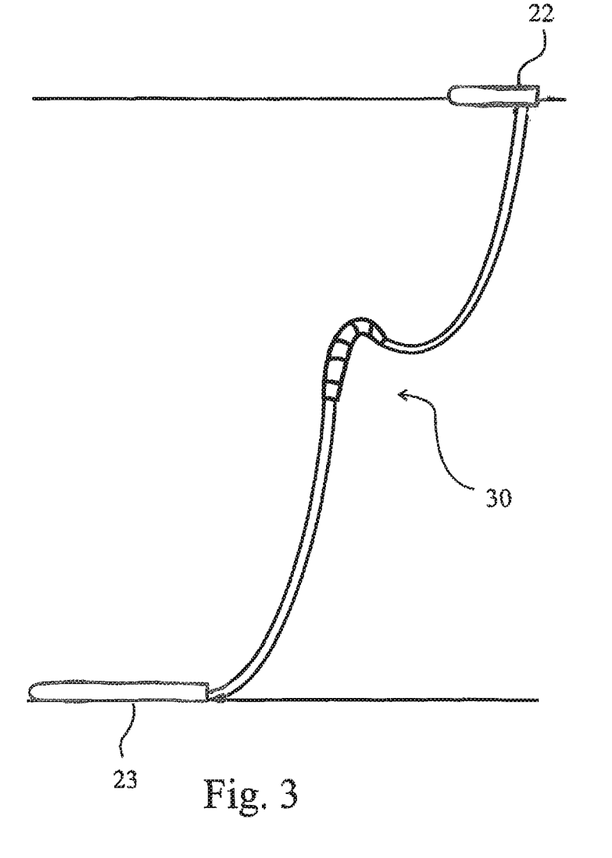
FIG. 3 illustrates an alternative riser configuration.

FIG. 3 illustrates an alternative riser structure connecting a flow line 23 to a surface vessel 22. As illustrated in FIG. 3 the riser has a first part reaching from the seabed flow line 23 to a central suspended region 30. A further part extends upwards from the central region 30 to the surface vessel. Around the central region 30 buoyancy modules are secured to the flexible pipe body. The buoyancy of the buoyancy modules and the location of the buoyancy modules is selected so that in use the riser takes a predesigned shape. One advantage of such a riser is that as the surface where the vessel 22 floats rises or dips the only the part of the riser linking the vessel to the central buoyed area flexes. In this way over-bending of the riser can be obviated. It will be appreciated that certain embodiments of the present invention can be used with a wide variety of riser or jumper shapes.

Figure 4:
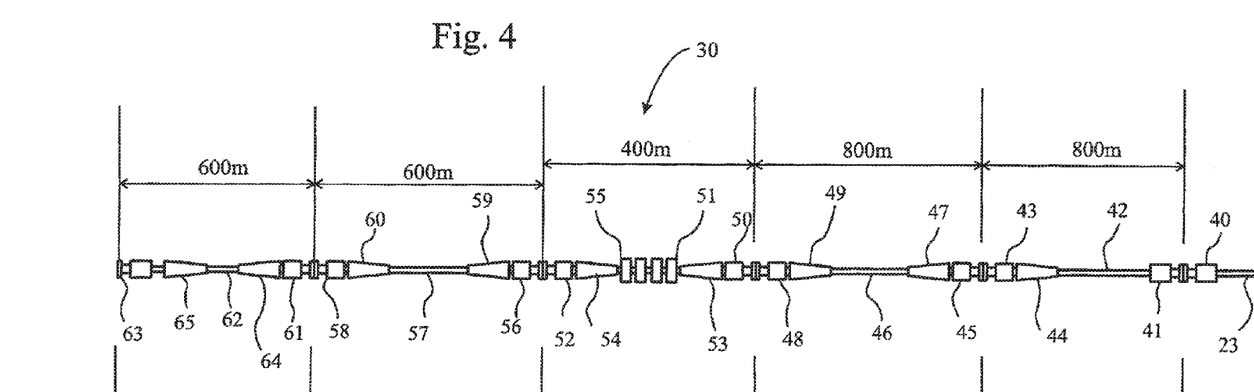
FIG. 4 illustrates a riser or jumper assembly.

FIG. 4 illustrates a riser assembly able to adopt the configuration of the riser illustrated in FIG. 3.

The flow line 23 is terminated at an end with an end fitting 40. This end fitting is connected in an end-to-end configuration with a further end fitting 41 of a first segment 42 of flexible pipe body. A further end of the flexible pipe body of the first segment 42 is terminated with a further respective end fitting 43. A bend stiffener 44 is located at the end of the segment 42 of flexible pipe body close to the end fitting 43. The bend stiffener is tapered so as to offer gradually greater and greater stiffness to the flexible pipe body towards the end fitting 43. This obviates over-bending as will be appreciated by those skilled in the art.

The end fitting 43 of the first segment 42 of flexible pipe body is connected to a further end fitting 45 of an adjacent further segment 46 of flexible pipe body. A further bend stiffener 47 tapers inwardly towards the central region of the adjacent segment 46 of flexible pipe body. A remaining end of the flexible pipe body is terminated with a further end fitting 48 with a respective bend stiffener 49. The end fitting 48 of the adjacent segment is connected to an end fitting 50 of an intermediate segment 51 of flexible pipe body. A remaining end of the intermediate segment 51 of flexible pipe body is terminated with a further end fitting 52. A first bend stiffener 53 is located at an end of the flexible pipe body proximate to a respective end fitting 50. A further bend stiffener 54 is located proximate to the end fitting 52 terminating the remaining end of the intermediate segment 51 of flexible pipe body. Four buoyancy modules 55 are located in a row at the central region of the intermediate segment 51 of flexible pipe body. It is to be appreciated that whilst four buoyancy modules are indicated one or more buoyancy modules may be utilized according to certain embodiments of the present invention. The buoyancy modules and the method of securing these to the flexible pipe body is described hereinbelow in more detail with reference to FIG. 5.

The end fitting 52 terminating an end of the intermediate segment 51 of flexible pipe body is secured in an end-to-end configuration with a further end fitting 56 of an adjacent segment 57 of flexible pipe body. A remaining end of this adjacent segment 57 of flexible pipe body is terminated with a further end fitting 58. Bend stiffeners 59, 60 are located close to respective end fittings 56, 58.

The end fitting 58 of the adjacent segment 57 of flexible pipe body is connected in an end-to-end configuration with a still further end fitting 61 of an end segment 62 of flexible pipe body. A remaining end of the end segment 62 of flexible pipe body is terminated with a respective end fitting 63. Respective bend stiffeners 64, 65 are located proximate to the corresponding end fittings 61, 63.

It is to be appreciated that one or more segments of flexible pipe are thus provided on either side of an intermediate segment of flexible pipe where buoyancy modules are located. It will be appreciated that rather than the two segments illustrated on either side of the intermediate segment shown in FIG. 2, one, two or any number of segments may be provided on either side of the intermediate segment. Likewise, it is not essential that the numbers of segments of flexible pipe body are the same on either side of the intermediate segment. It is also to be appreciated that one, two or more intermediate segments of flexible pipe body may be utilised according to certain embodiments of the present invention.

Figure 5:
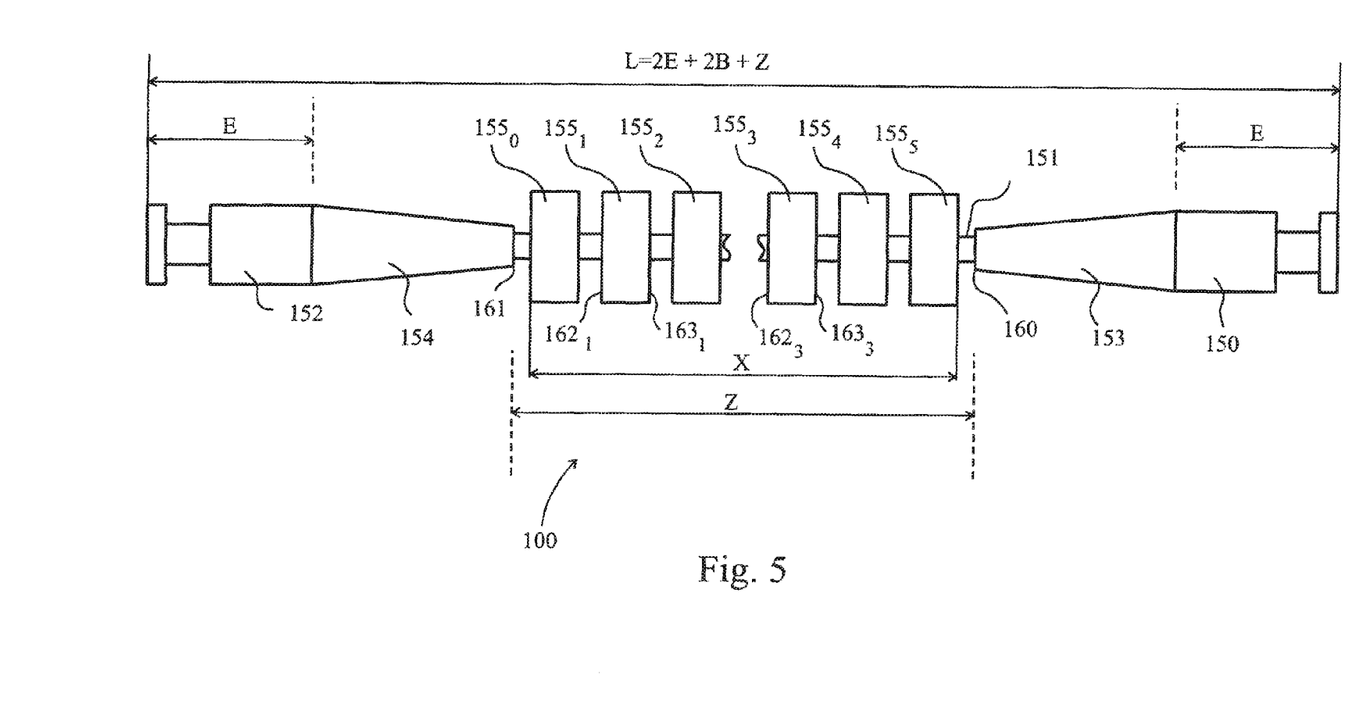
FIG. 5 illustrates buoyancy modules secured to flexible pipe body.

FIG. 5 illustrates an alternative intermediate segment 100 of flexible pipe in more detail. The intermediate section of pipe has a first end terminated by an end fitting 150 and a further end terminated by a further end fitting 152. A length of flexible pipe body 151 is terminated at both ends by a respective one of the end fittings 150, 152. As illustrated in FIG. 5 the flexible pipe body has a length extending between the two end fittings. A bend stiffener 153 is secured to the first end fitting 150 and a further bend stiffener 154 is secured to the further end fitting 152 at the other end of the segment. Each bend stiffener is a generally tapered device, as will be appreciated by those skilled in the art, used to moderate the stiffness of the flexible pipe from a central region, where flexibility is defined by the characteristics of the flexible pipe body, to the rigid end fittings 150, 152. Six buoyancy modules $155_{0-5}$ are located adjacent to each other in a line between the bend stiffeners. Whilst six buoyancy modules are illustrated in FIG. 5 it will be appreciated that any number of buoyancy modules, including one, two or more, may be utilised dependent upon the configuration and amount of buoyancy required in the riser or jumper in use. The buoyancy modules $155_{0-5}$ are secured to the flexible pipe body 151 via a conventional means such as via a clamping mechanism.

The intermediate section 100 has an overall length L equal to the combined length of the two end fittings E plus the combined length of the two bend stiffeners B plus the remaining length Z of flexible pipe body between the inner ends of the bend stiffeners.

An inwardly facing end 160 of the first bend stiffener 153 provides an abutment surface for any buoyancy module which becomes unsecured from the flexible pipe body 151. An inwardly facing end 161 of the further bend stiffener 154 likewise provides an abutment surface against which any buoyancy module $155_0$ will abut should it become detached from the flexible pipe body. Each buoyancy module itself has a first and further side wall $162_{0-5}$, $163_{0-5}$ against which adjacent buoyancy modules will abut should they become detached from the flexible pipe body.

It will be appreciated that by selecting the lengths of the end stiffeners and the length of flexible pipe body used during a design stage the distance Z between the abutment ends 160, 161 of the bend stiffeners can be precisely set so that there is sufficient distance between the buoyancy modules and the ends of the bend stiffeners to allow the flexible pipe to adopt a desired shape during use but with no or little excess room so that should a buoyancy module fail movement of those buoyancy modules is constrained completely or to at least a certain extent.

For example, should the mechanism by which the buoyancy module $155_5$ at the end of the row is attached to the flexible pipe body 151 fail the buoyancy module will effectively become free to move along the length of the flexible pipe body. However, its motion is constrained by the abutment surface 160 of the inwardly facing end of the bend stiffener 153 or by a side wall $162_4$ of the adjacent buoyancy module $155_4$.

Figure 6:
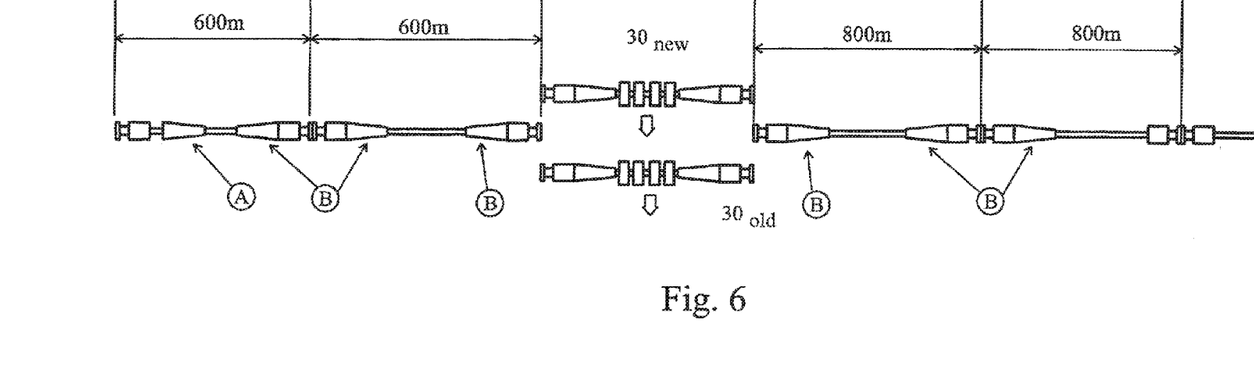
FIG. 6 illustrates replacement of an intermediate segment of flexible pipe.

FIG. 6 illustrates how the intermediate segment 30 of flexible pipe shown in FIG. 4 may be replaced. The intermediate segment 100 shown in FIG. 5 could be replaced in a similar way. It will be appreciated that such replacement may be required or desired when a 10 part or parts of the flexible pipe segment 30 fail or when the characteristics offered by the intermediate segment 30 are no longer optimum according to characteristics of the environment where the riser or jumper assembly are used. In such a situation the old intermediate section $30_{OLD}$ is replaced by a new intermediate section $30_{NEW}$. For example should one or more buoyancy modules 155 become detached from the flexible pipe body or should one or more of the buoyancy modules fail, such as by an outer shell being breached and flooding with seawater, the end fitting 50 at a first end of the intermediate segment 51 of flexible pipe body can be detached from the adjoining end fitting 48 of the adjacent segment of flexible pipe. Likewise, the further end fitting 52 of the intermediate segment of flexible pipe can be detached from the end fitting 56 of the further adjacent segment of flexible pipe body. A new intermediate segment $30_{NEW}$ is then brought into position and respective end fittings secured together. The replacement intermediate segment may have a similar or different length to the previously used segment. It is highly convenient if the intermediate segment of flexible pipe is manufactured at the same time as the remaining segments of any riser or jumper assembly. One, two or more replacement segments may be manufactured at this time and then stored for later use if needed.

Certain embodiments of the present invention thus create a flexible pipe system useable in a wide variety of environments, for example, deep and ultra-deep water operations. Effects of buoyancy module clamp failure are thus minimised by confining the buoyancy modules which are required between two end fittings. These or the bend stiffeners attached to the end fittings act as buoyancy stoppers avoiding modules significantly changing position. This can be achieved whilst having a low impact on system configuration requirements and service life.

Certain embodiments of the present invention allow a relatively fast recovery of the flexible pipe system in the case of one or more buoyancy module failures or where a net buoyancy capacity decreases due to module water saturation or flexible pipe structure premature failure. Fast recovery can be achieved by replacing the damaged buoyancy riser or jumper segment by a spare, previously assembled, segment.

This eliminates the necessity for offshore pipe completion activities and considerably reduces a time required to restart pipeline operation.

The jumper or riser assemblies utilise one or more intermediate segments each having a total length defined by a required buoyancy length plus the length required for the flexible pipes ancillary assembly. This includes end fittings and bend stiffeners and other such devices. The intermediate segment is positioned in the overall jumper or riser system at a specific location defined during global analysis in order to maximise the fatigue service life and guarantee that the flexible pipe operational conditions are respected.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A riser or jumper assembly for connection to a flowline on the seabed and for transporting production, exportation or injection fluids from a source location to a target location, comprising:
    a first segment of flexible pipe comprising a portion of flexible pipe body and a first end fitting and a second end fitting;
    a further segment of flexible pipe comprising a portion of flexible pipe body and a first end fitting and a second end fitting; and
    an intermediate segment of flexible pipe comprising a portion of flexible pipe body and a first end fitting and a second end fitting and at least one cylindrical buoyancy element secured to the intermediate section of flexible pipe body and between the first end fitting and the second end fitting of said intermediate segment of flexible pipe,
    wherein each of the first, further and intermediate segments of flexible pipe has an innermost carcass layer, an internal pressure sheath, a pressure armour layer, an outer sheath and wherein the at least one buoyancy element is confined on the intermediate segment between end fittings which provide buoyancy stoppers in the event of buoyancy clamp failure;
    wherein the first end fitting and the second end fitting of the intermediate segment terminate respective first and second ends of the portion of flexible pipe body of the intermediate segment;
    a first bend stiffener and a second bend stiffener disposed coaxially on the flexible pipe body of the intermediate segment, each bend stiffener having respective first and second opposing ends, each bend stiffener tapering from the first end to the second end of the bend stiffener, the first end of each bend stiffener being secured to one of the end fittings of the intermediate segment;
    wherein the at least one cylindrical buoyancy element is clamped around and onto an outer surface of the portion of the flexible pipe body of the intermediate segment at a location along the intermediate segment between the second ends of the bend stiffeners.

2. The riser or jumper assembly as claimed in claim 1, wherein:
    the first segment of flexible pipe comprises the first end fitting and the second end fitting terminating respective first and second ends of the portion of flexible pipe body of the first segment and a first bend stiffener and a second bend stiffener each secured to a respective end fitting of the first segment.

3. The riser or jumper assembly as claimed in claim 1, wherein:
    the further segment of flexible pipe comprises the first end fitting and the second end fitting terminating respective first and second ends of the portion of flexible pipe body of the further segment and a first bend stiffener and a second bend stiffener each secured to a respective end fitting of the further segment.

4. The riser or jumper assembly as claimed in claim 1 wherein the length of the intermediate segment is equal to a combined length of the first end fitting and the second end fitting plus a required buoyancy length.

5. The riser or jumper assembly as claimed in claim 1, further comprising:
    at least one still further segment of flexible pipe comprising a portion of flexible pipe body and a respective first end fitting and a respective second end fitting.

6. A method for providing buoyancy to a jumper or riser assembly which is for connection to a flowline on a seabed, which jumper or riser assembly comprises a first segment of flexible pipe body, a second segment of flexible pipe body and an intermediate segment of flexible pipe body, wherein each of the first, second and intermediate segments of flexible pipe has an innermost carcass layer, an internal pressure sheath, a pressure armour layer, an outer sheath and wherein at least one cylindrical buoyancy element is confined on the intermediate segment between first and second end fittings which provide buoyancy stoppers in the event of buoyancy clamp failure, the method comprising the steps of:
    providing lift to the intermediate segment of flexible pipe via the at least one cylindrical buoyancy element;
    wherein the first end fitting and the second end fitting of the intermediate segment terminate respective first and second ends of the flexible pipe body of the intermediate segment;
    wherein a first bend stiffener and a second bend stiffener are disposed coaxially on the flexible pipe body of the intermediate segment, each bend stiffener having respective first and second opposing ends, each bend stiffener tapering from the first end to the second end of the bend stiffener, the first end of each bend stiffener being secured to one of the end fittings of the intermediate segment;
    wherein the at least one cylindrical buoyancy element is clamped around and onto an outer surface of the flexible pipe body of the intermediate segment at a location along the intermediate segment between the second ends of the bend stiffeners.

7. The method as claimed in claim 6, further comprising the steps of:
    identifying a failure of a buoyancy element of the at least one buoyancy element; and
    subsequently replacing the intermediate segment with a replacement intermediate segment comprising a replacement portion of flexible pipe body, a replacement first end fitting and a replacement second end fitting and at least one replacement buoyancy element.

8. The method as claimed in claim 7 wherein the step of identifying a failure comprises:
   identifying when a clamp clamping the at least one buoyancy element to an outer surface of flexible pipe body has failed; or
   identifying when the at least one buoyancy element has become saturated; or
   identifying that the riser or jumper assembly is not adopting a predetermined shape.

9. The method as claimed in claim 7 wherein the replacement intermediate segment comprises a spare, previously assembled, segment of flexible pipe.

10. A riser assembly for transporting production, exportation or injection fluids from a source location to a target location, comprising:
   a first segment of flexible pipe comprising a portion of flexible pipe body and a first end fitting and a second end fitting;
   a further segment of flexible pipe comprising a portion of flexible pipe body and a first end fitting and a second end fitting; and
   an intermediate segment of flexible pipe comprising a portion of flexible pipe body and a first end fitting and a second end fitting and at least one cylindrical buoyancy element secured to the intermediate section of flexible pipe body and between the first end fitting and the second end fitting of said intermediate segment of flexible pipe;
   wherein the intermediate segment comprises a first bend stiffener and a second bend stiffener each secured to a respective end fitting of the intermediate segment; and
   wherein the at least one cylindrical buoyancy element is clamped around and onto an outer surface of the portion of the flexible pipe body of the intermediate segment at a respective location between the first bend stiffener and the second bend stiffener of the intermediate segment.

11. The riser assembly as claimed in claim 10, wherein:
   the first segment of flexible pipe comprises the first end fitting and the second end fitting terminating respective first and second ends of the portion of flexible pipe body of the first segment and a first bend stiffener and a second bend stiffener each secured to a respective end fitting of the first segment.

12. The riser assembly as claimed in claim 10, wherein:
   the further segment of flexible pipe comprises the first end fitting and the second end fitting terminating respective first and second ends of the portion of flexible pipe body of the further segment and a first bend stiffener and a second bend stiffener each secured to a respective end fitting of the further segment.

13. The riser assembly as claimed in claim 10 wherein the length of the intermediate segment is equal to a combined length of the first end fitting and the second end fitting plus a required buoyancy length.

\* \* \* \* \*